United States Patent
Hosoda et al.

(10) Patent No.: US 6,794,847 B2
(45) Date of Patent: Sep. 21, 2004

(54) CHARGING SYSTEM FOR VEHICLE

(75) Inventors: Masaharu Hosoda, Saitama (JP);
Masaaki Kaizuka, Saitama (JP);
Kazunari Takahashi, Saitama (JP);
Shigeru Aoki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 244 days.

(21) Appl. No.: 10/059,196

(22) Filed: Jan. 31, 2002

(65) Prior Publication Data

US 2002/0101217 A1 Aug. 1, 2002

(30) Foreign Application Priority Data

Feb. 1, 2001 (JP) ..................................... P. 2001-025481

(51) Int. Cl.[7] ................................................ H02J 7/00
(52) U.S. Cl. ....................................................... 320/104
(58) Field of Search ................................ 320/104, 132, 320/163; 318/434; 363/98

(56) References Cited

U.S. PATENT DOCUMENTS 6,002,603 A * 12/1999 Carver ......................... 363/98
6,333,620 B1 * 12/2001 Schmitz et al. ............. 320/132
6,426,608 B2 * 7/2002 Amano et al. .............. 320/163
6,573,675 B2 * 6/2003 Schmitz et al. ............. 318/434

* cited by examiner

Primary Examiner—Pia Tibbits
(74) Attorney, Agent, or Firm—Arent Fox Kintner Plotkin & Kahn, PLLC

(57) ABSTRACT

The charging system for a vehicle includes: a motor generator which operates as a generator to generate an alternating current when the motor generator is driven by an internal combustion engine, and operates as a motor when an alternating current is supplied thereto; a switching circuit for converting the alternating current generated by the motor generator into a direct current; a first accumulator accumulating therein the direct current converted by the switching circuit; a second accumulator accumulating therein the direct current converted by the switching circuit and having a smaller accumulation voltage than that of the first accumulator; a first opening/closing unit interposed between the first accumulator and the switching circuit; a second opening/closing unit interposed between the second accumulator and the switching circuit; and, a control unit for controlling the opening and closing of the first and second opening/closing units.

8 Claims, 13 Drawing Sheets

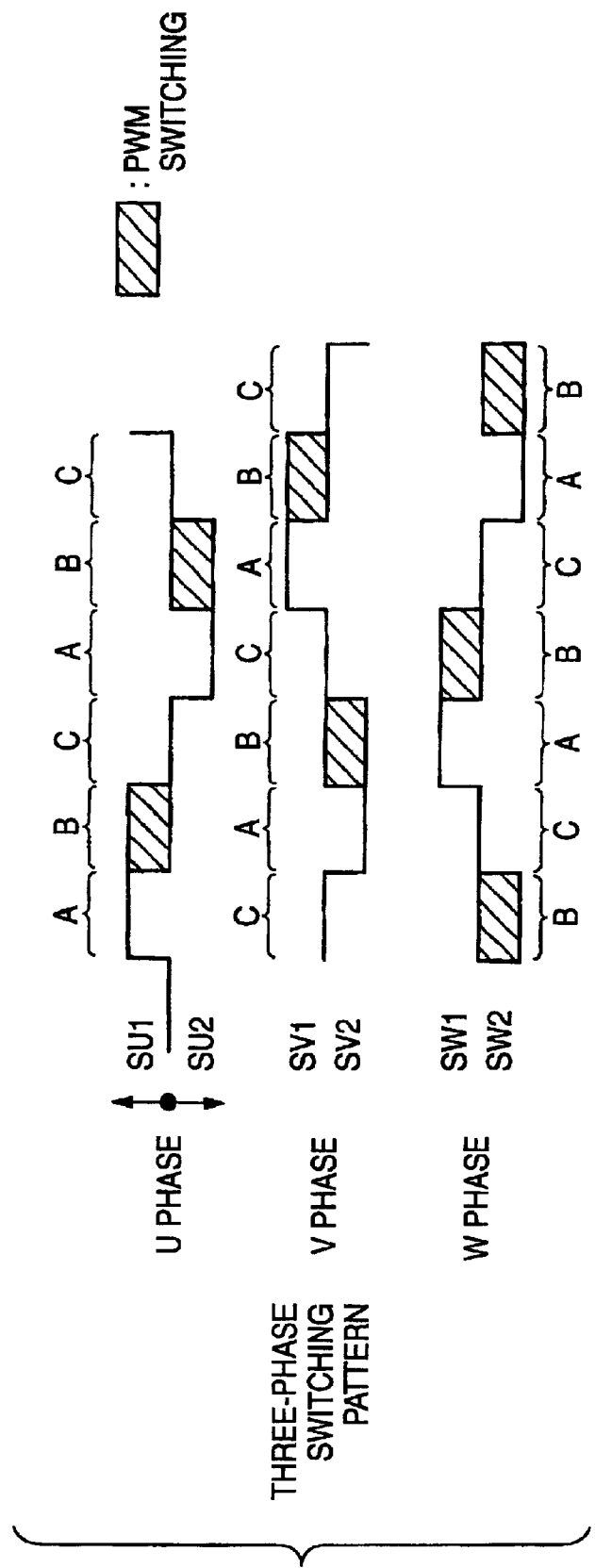

FIG. 3A

ROTATION ANGLE SENSOR OUTPUT
WAVEFORMS OF MOTOR GENERATOR | MOTOR GENERATOR ONE ROTATION

SEU
SEV
SEW

FIG. 3B

OUTPUT PATTERN (DRIVE MODE)

SU1  120°
SV1  ENERGIZATION ANGLE
SW1
SU2
SV2
SW2

FIG. 3C

OUTPUT PATTERN (REGENERATIVE MODE)    A  B  C

SU1
SV1
SW1
SU2
SV2
SW2

CHARGING SYSTEM FOR VEHICLE

BACKGROUND OF THE INVENTION

1. Field of the Invention

The present invention relates to a charging system for a vehicle for charging batteries carried on the vehicle.

2. Description of the Related Art

Recently, there is known a vehicle which carries two kinds of batteries with different voltages, that is, a main battery (for example, a 42V battery) and an auxiliary battery (for example, a 12V battery). In other words, there is known a vehicle which is capable of using properly two kinds of batteries with different voltages in such a manner the main battery is used to drive a motor requiring large electric power and the auxiliary battery is used to drive other units such as a control unit than the motor.

Now, FIG. 13 is a block diagram of a first example of a conventional charging system for charging the batteries of the above-mentioned type carried on a vehicle. This conventional charging system example includes two systems of charging circuits in order to charge two kinds of batteries with different voltages. That is, to charge a main battery 101, an alternating current generated by a motor generator 102 may be converted into a direct current by an inverter 104 which is controlled by a controller 103, and the thus-converted direct current may be supplied to the main battery 101. On the other hand, to charge an auxiliary battery 105, when an alternator 107 is rotated by an engine 106, a direct current generated by the alternator 107 may be supplied to the auxiliary battery 105.

Now, FIG. 14 is a block diagram of a second example of a conventional charging system for charging the batteries for vehicle of the above-mentioned type. In this example, there are used a DC/DC converter 108 changing the voltage in order to charge two kinds of batteries which differ in voltage from each other. That is, to charge a main battery 101, similarly to the first example, an alternating current generated by a motor generator 102 may be converted into a direct current by an inverter 104 which is controlled by a controller 103, and the-thus converted direct current may be supplied to the main battery 101. On the other hand, an auxiliary battery 105 can be charged by converting the output voltage of an inverter 104 using the DC/DC converter 108.

However, since the above-mentioned conventional charging systems require the alternator and DC/DC converter, the charging systems are complicated in structure and expensive in the manufacturing costs thereof.

SUMMARY OF THE INVENTION

The present invention aims at eliminating the drawbacks found in the above-mentioned conventional charging systems. Accordingly, it is an object of the invention to provide a charging system for a vehicle which is neither complicated in structure nor expensive in cost.

In attaining the above object, according to the present invention, there is provided a charging system for a vehicle, including: a motor generator which operates as a generator to generate an alternating current when the motor generator is driven by an internal combustion engine, and operates as a motor when an alternating current is supplied thereto; a switching circuit for converting an alternating current generated by the motor generator into a direct current; a first accumulator for accumulating therein the direct current converted by the switching circuit; a second accumulator for accumulating therein the direct current converted by the switching circuit and having an accumulation voltage smaller than that of the first accumulator; a first opening/closing unit interposed between the first accumulator and switching circuit; a second opening/closing unit interposed between the second accumulator and switching circuit; and, a control unit for controlling the opening and closing of the first and second opening/closing units.

BRIEF DESCRIPTION OF THE DRAWINGS

FIG. 2 is a flow chart of waveforms to be applied to a bridge circuit 5B of the inverter 5 when charging vehicle batteries;

FIG. 3A to 3C are timing charts of the waveforms of the respective parts of the charging system when driving a motor or charging the batteries;

DETAILED DESCRIPTION OF THE PREFERRED EMBODIMENTS

Figure 1:
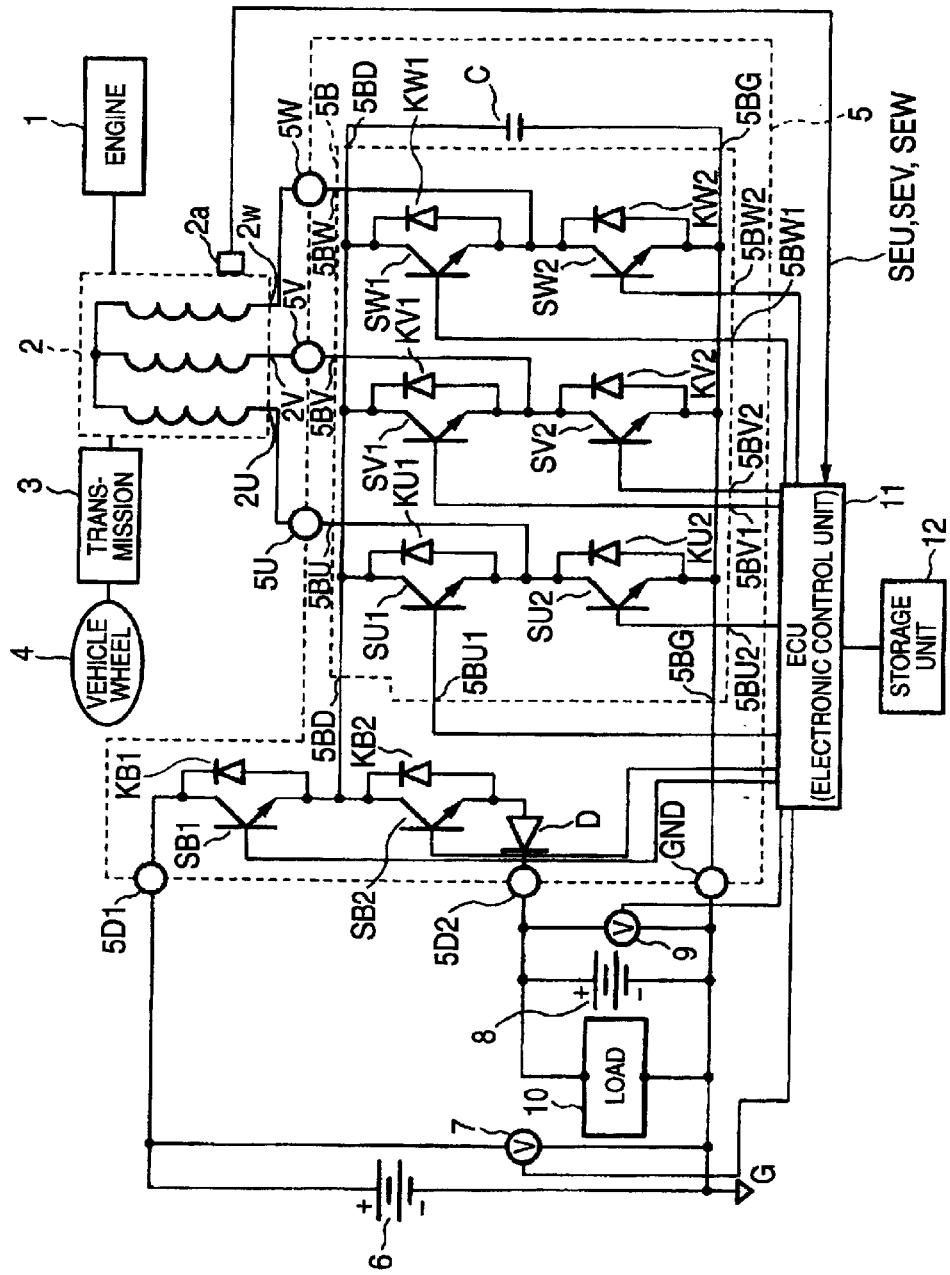
FIG. 1 is a block diagram of a charging system for a vehicle according to an embodiment of the invention.

Now, FIG. 1 is a block diagram of the structure of a charging system for a vehicle according to an embodiment of the invention. The output shaft of an engine 1 is connected to the rotary shaft of a motor generator 2, while they cooperate together in forming a common shaft. This common shaft is connected to a transmission 3, while the output shaft of the transmission 3 is connected to wheels 4. Due to this, the engine 1 is capable of rotating the wheels 4 through the transmission 3 to thereby run a vehicle. In this operation, since the engine 1 rotates the rotary shaft of the motor generator 2, the motor generator 2 operates as a generator and thus generates an alternating current. On the other hand, when starting the engine 1, an alternating current is supplied to the motor generator 2 to thereby operate the motor generator 2 as a motor. The output shaft of the engine 1 is rotated by the motor generator 2 operating as a motor and, at that time, fuel is supplied and a plug is ignited to thereby start the engine 1.

The motor generator 2 includes three input/output terminals 2U, 2V and 2W respectively corresponding to three phases (U phase, V phase, W phase). These input/output terminals 2U, 2V and 2W are respectively connected to the AC input/output terminals 5U, 5V and 5W of an inverter 5. The inverter 5 further includes two DC input/output terminals 5D1, 5D2 and a grounding terminal GND.

The inverter 5, when the motor generator 2 operates as a generator, inputs an alternating current sent from the motor generator 2 through the AC input/output terminals 5U, 5V and 5W, converts the alternating current to a direct current, and outputs the direct current from the AC input/output terminal 5D1 and the grounding terminal GND or from the AC input/output terminal 5D2 and the grounding terminal GND.

On the other hand, when the motor generator 2 operates as a motor, the inverter 5 converts a direct current input from the AC input/output terminal 5D1 and the grounding terminal GND or from the AC input/output terminal 5D2 and the grounding terminal GND to an alternating current, outputs the converted alternating current from the AC input/output terminals 5U, 5V and 5W, and sends it to the motor generator 2.

The inverter 5 incorporates therein a bridge circuit 5B, a smoothing condenser C, a reverse current preventive diode D, transistors SB1, SB2, and parasitic diodes KB1, KB2 formed together with the transistors SB1, SB2.

That is, between the collectors and emitters of the transistors SB1, SB2, there are formed the parasitic diodes KB1, KB2 respectively. Equivalently, the anodes of the parasitic diodes KB1, KB2 are respectively connected to the emitters of the transistors SB1, SB2, while the cathodes of the parasitic diodes KB1, KB2 are respectively connected to the collectors of the transistors SB1, SB2.

The collector of the transistor SB1 is connected to the AC input/output terminal 5D1, while the emitter of the transistor SB1 is connected to the collector of the transistor SB2. The emitter of the transistor SB2 is connected to the anode of the reverse current preventive diode D, while the cathode of the reverse current preventive diode D is connected to the AC input/output terminal 5D2.

The bridge circuit 5B, which is a switching circuit, includes AC input/output terminals 5BU, 5BV, 5BW, DC input/output terminals 5BD, grounding terminals 5BG, and control terminals 5BU1, 5BU2, 5BV1, 5BV2, 5BW1, 5BW2. The AC input/output terminals 5BU, 5BV, 5BW are respectively connected to the AC input/output terminals 5U, 5V and 5W of the inverter 5, while the DC input/output terminals 5BD are respectively connected to the emitter of the transistor SB1 and the collector of the transistor SB2. The grounding terminals 5BG are connected to the grounding terminal GND of the inverter 5. Also, the smoothing condenser C is connected between the DC input/output terminals 5BD and grounding terminals 5BG.

Now, description will be given below of the internal structure of the bridge circuit 5B. The bridge circuit 5B incorporates therein a plurality of switching elements, that is, transistors SU1, SU2, SV1, SV2, SW1, SW2. Between the collectors and emitters of these transistors SU1, SU2, SV1, SV2, SW1, SW2, there are formed parasitic diodes KU1, KU2, KV1, KV2, KW1, KW2 respectively. Equivalently, the anodes of the respective parasitic diodes are connected to the emitters of the respective transistors, while the cathodes of the respective parasitic diodes are connected to the collectors of the respective transistors.

The collectors of the transistors SU1, SV1, SW1 are all connected to the DC input/output terminals 5BD. The emitter of the transistor SU1 is connected to the collector of the transistor SU2, the emitter of the transistor SV1 is connected to the collector of the transistor SV2, and the emitter of the transistor SW1 is connected to the collector of the transistor SW2. The emitters of the transistors SU2, SV2, SW2 are all connected to the grounding terminals 5BG.

The AC input/output terminal 5BU is connected to the emitter of the transistor SU1 and the collector of the transistor SU2, the AC input/output terminal 5BV is connected to the emitter of the transistor SV1 and the collector of the transistor SV2, and the AC input/output terminal 5BW is connected to the emitter of the transistor SW1 and the collector of the transistor SW2.

Between the DC input/output terminal 5D1 and the grounding terminal GND of the inverter 5, there are connected a 42V battery 6 serving as a first accumulator which can be charged, and a first voltage detect unit 7 for detecting a voltage across the 42V battery 6. Also, between the DC input/output terminal 5D2 and grounding terminal GND of the inverter 5, there are connected a 12V battery 8 serving as a second accumulator which can also be charged, and a second voltage detect unit 9 for detecting a voltage across the 12V battery 8. Between the two ends of the 12V battery 8, there is connected a load 10 which can be driven by the 12V battery 8. That is, there are disposed the first and second accumulators for accumulating therein direct currents converted by the bridge circuit 5B serving as a switching circuit; and, between the first accumulator and switching circuit, there is interposed the transistor SB1 serving as a first opening/closing unit and, between the second accumulator and switching circuit, there is interposed the transistor SB2 serving as a second opening/closing unit, while electric energization through the opening/closing operations by the first and second opening/closing units is controlled by an ECU (electronic control unit) 11 serving as a control unit.

The results (the detected voltage values) detected by the first and second voltage detect units 7 and 9 are input to the ECU 11. To the ECU 11, there are also input the outputs SEU, SEV, SEW of a rotation angle sensor 2a which detects the rotation angle of the motor generator 2. The ECU 11 is connected to a storage unit 12 which stores the maps (data) of the duties (the on/off ratios) of pulses to be supplied for driving the respective transistors of the bridge circuit 5B. Also, the ECU 11 is connected to the control terminals 5BU1, 5BU2, 5BV1, 5BV2, 5BW1, 5BW2 of the bridge circuit 5B and supplies the above-mentioned pulses to these control terminals. Further, the ECU (Electronic Control Unit) 11 is connected to the bases of the transistors SB1 and SB2 and controls the on/off of these transistors.

That is, in the present charging system, there are disposed the first and second accumulators which respectively accumulate the direct currents converted by the bridge circuit 5B serving as the switching circuit; the transistor SB1 which functions as the first opening/closing unit is interposed between the first accumulator and switching circuit; the transistor SB2 which functions as the second opening/closing unit is interposed between the second accumulator and switching circuit; and, the electric energization through the opening/closing operations by the first and second opening/closing units is controlled by the ECU 11 serving as the control unit.

The ECU 11 controls the bridge circuit 5B in accordance with the detected results of the voltages between the terminals of the respective batteries obtained by the first and second voltage detect units 7 and 9 as well as the outputs SEU, SEV, SEW issued from the rotation angle sensor 2a. Since the control of the bridge circuit 5B by the ECU 11 is PWM control (control which repeats the on/off of the bridge circuit 5B through pulse width modulation), when sending the pulses to the bridge circuit 5B, the duties of the pulses are determined in accordance with the maps previously stored in the storage unit 12.

The ECU (Electronic Control Unit) 11 controls the inverter 5 in the following manner: that is, when charging the 42V battery 6 serving as a high voltage supply, the bridge circuit 5B is used to raise the voltage of the 42V battery 6 up to a high voltage (42V); and, when charging the 12V battery 8 serving as a low voltage supply, the voltage of the 12V battery 8 is raised up to a low voltage (12V). By the way, the transistors SB1 and SB2, which distribute the outputs of the inverter 5 to the two batteries, may be disposed on the same chip as the bridge circuit 5 or may be formed on another chip.

Now, FIG. 2 is a timing chart of waveforms to be applied to the bridge circuit 5B of the inverter 5 when charging the batteries. In a period A of FIG. 2, the respective transistors disposed within the bridge circuit 5B are stationarily turned on, in a period B, the respective transistors are PWM controlled and, in a period C, the respective transistors are turned off.

Now, FIGS. 3A to 3C are timing charts of the waveforms of the respective parts of the charging system when driving the motor or charging the batteries. Specifically, FIG. 3A shows the output waveforms of the rotation angle sensor 2a disposed in the motor generator 2. FIG. 3B shows waveforms to be applied to the bridge circuit 5B of the inverter 5 in a drive mode (a mode in which electric power is supplied to the motor generator 2 from the 42V battery 6 to thereby use the motor generator 2 as a motor). FIG. 3C shows waveforms to be applied to the bridge circuit 5B of the inverter 5 in a regenerative mode (a mode in which the motor generator 2 is used as a generator to thereby charge the batteries). These waveforms includes the period A in which the respective transistors are stationarily turned on, the period B in which the respective transistors are PWM controlled so that the respective transistors are repeatedly turned on and off, and the period C in which the respective transistors are turned off. By the way, the waveforms shown in FIG. 3C are synchronized in accordance with the output waveforms of the rotation angle sensor 2a in FIG. 3A. In other words, in charging the batteries, the ECU 11 synchronizes the waveforms to be sent to the bridge circuit 5B in accordance with the output waveforms of the rotation angle sensor 2a.

The charging system according to the present embodiment includes five kinds of operation modes: that is, a 42V drive mode, a 42V charge mode, a 12V charge mode, a pre-charge mode, and a discharge mode.

Figure 4:
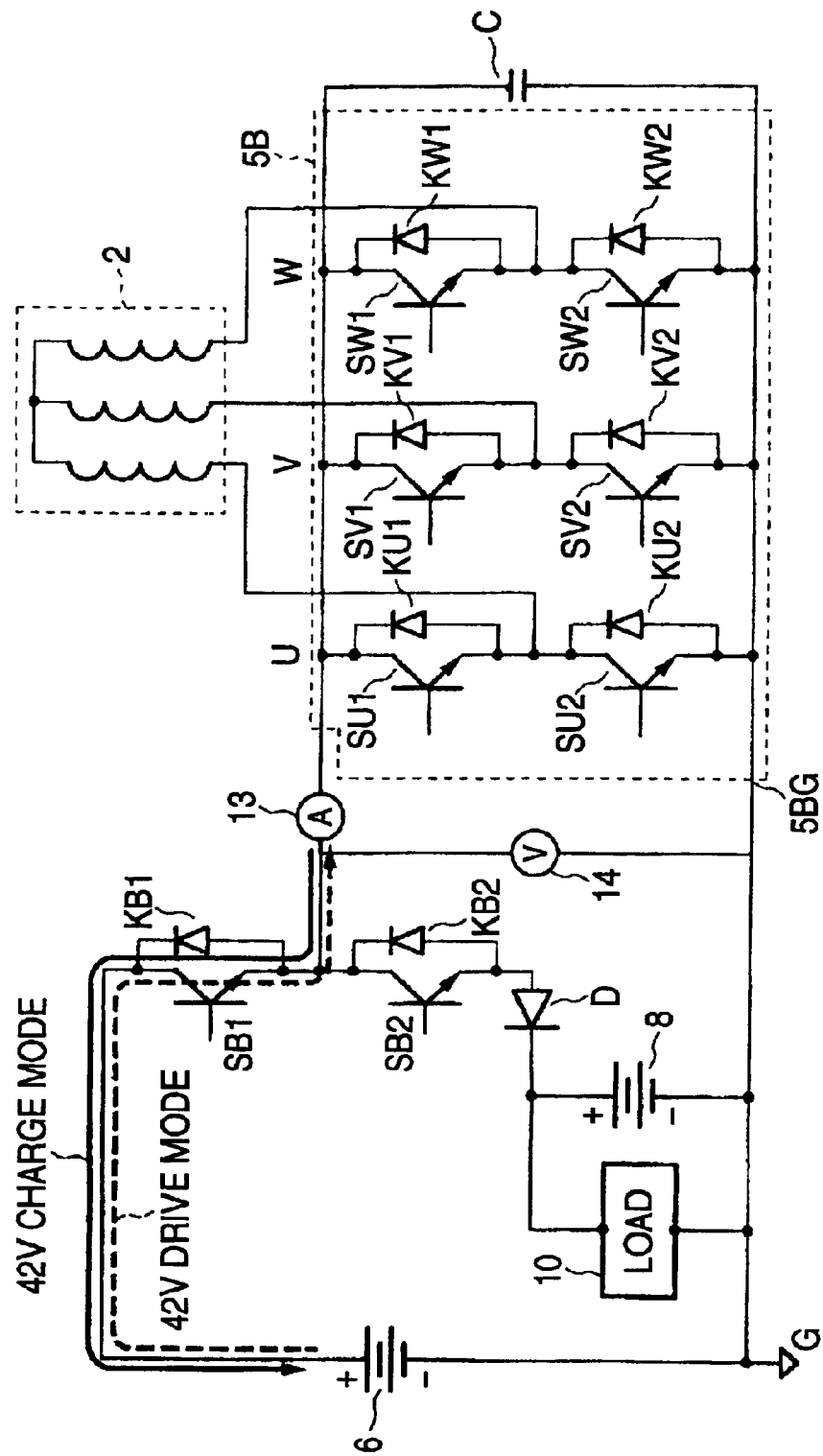
FIG. 4 is an explanatory view of the flow of currents in a 42V drive mode and in a 42V charge mode.

Now, FIG. 4 is an explanatory view of the flow of currents in the 42V drive mode and the 42V charge mode. When starting the engine 1, the motor generator 2 is driven by electric power supplied from the 42V battery 6, and the motor generator 2 is thus operated as a motor, that is, the motor generator 2 rotates the output shaft of the engine 1, thereby starting the engine 1; and, therefore, the mode for starting the engine 1 is referred to as a 42V drive mode. In this case, the transistor SB1 is turned on, whereas the transistor SB2 is turned off.

In the 42V charge mode for charging the 42V battery 6, the transistors SB1 and SB2 are turned off, and a charging current is supplied to the 42V battery 6 through the parasitic diode KB1. In this mode, the bridge circuit 5B is controlled by the ECU 11 so as to generate a constant voltage (42V) In detail, the storage unit 12 previously stores the maps of the duties, which correspond to the number of rotations of the motor generator 2 and are used to obtain a desired voltage value (42V); and, with reference to the maps, the ECU 11 controls the duties of the waveforms to drive the respective transistors disposed within the bridge circuit 5B.

Figure 5:
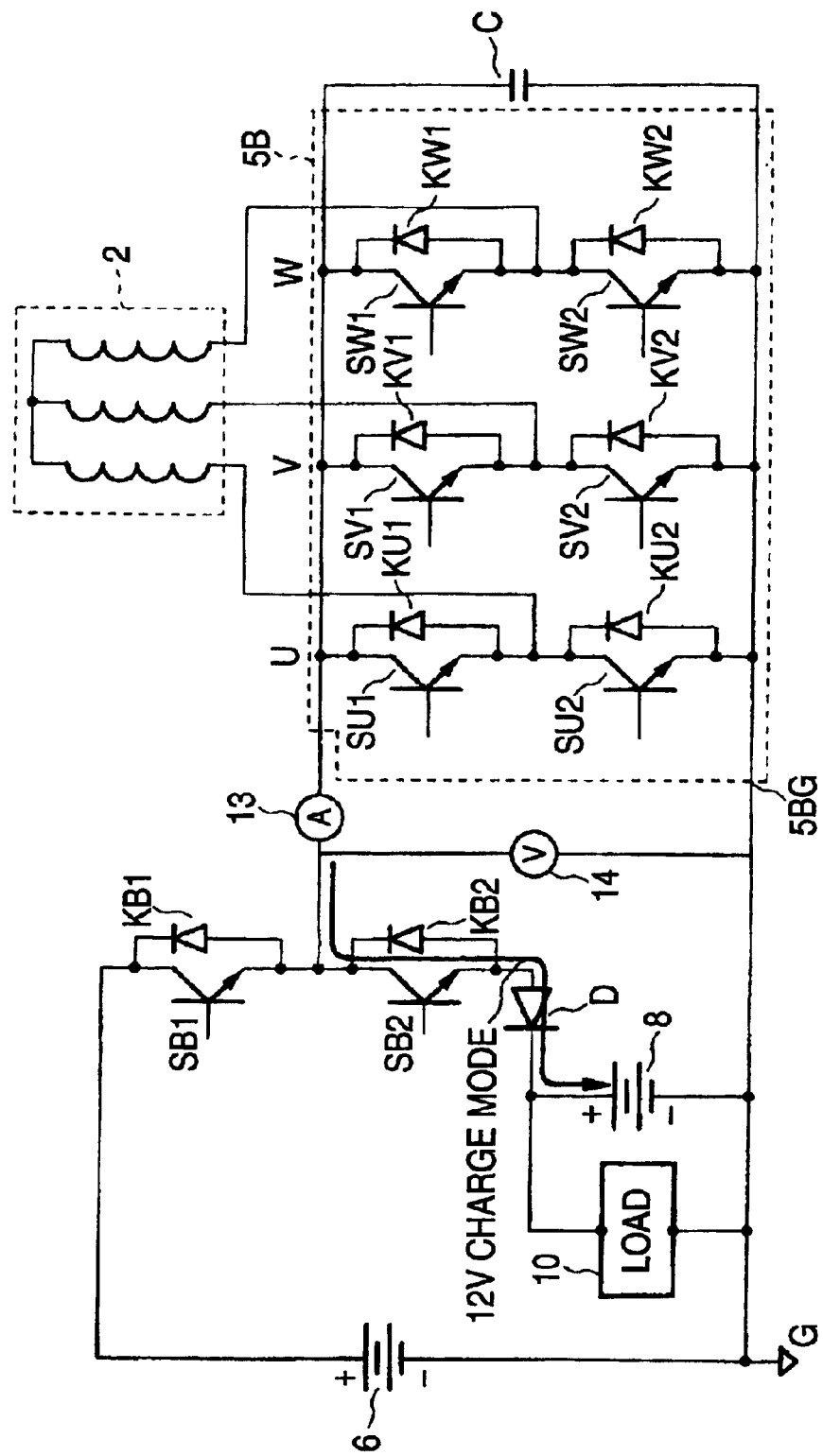
FIG. 5 is an explanatory view of the flow of currents in a 12V charge mode.

Now, FIG. 5 is an explanatory view of the flow of currents in the 12V charge mode. In the 12V charge mode for charging the 12V battery 8, the transistor SB1 is turned off, the transistor SB2 is turned on, and the 12V battery 8 is charged through the transistor SB2 and reverse current preventive diode D. The reverse current preventive diode D prevents a current from flowing reversely from the 12V battery 8 to the bridge circuit 5B.

In this mode, the bridge circuit 5B is controlled by the ECU 11 such that it generates a constant voltage (12V). In detail, the storage unit 12 previously stores the maps of the duties which correspond to the number of rotations of the motor generator 2 and are used to obtain a desired voltage value (12V); and, with reference to the maps, the ECU 11 controls the duties of the waveforms to drive the respective transistors disposed within the bridge circuit 5B.

Figure 6:
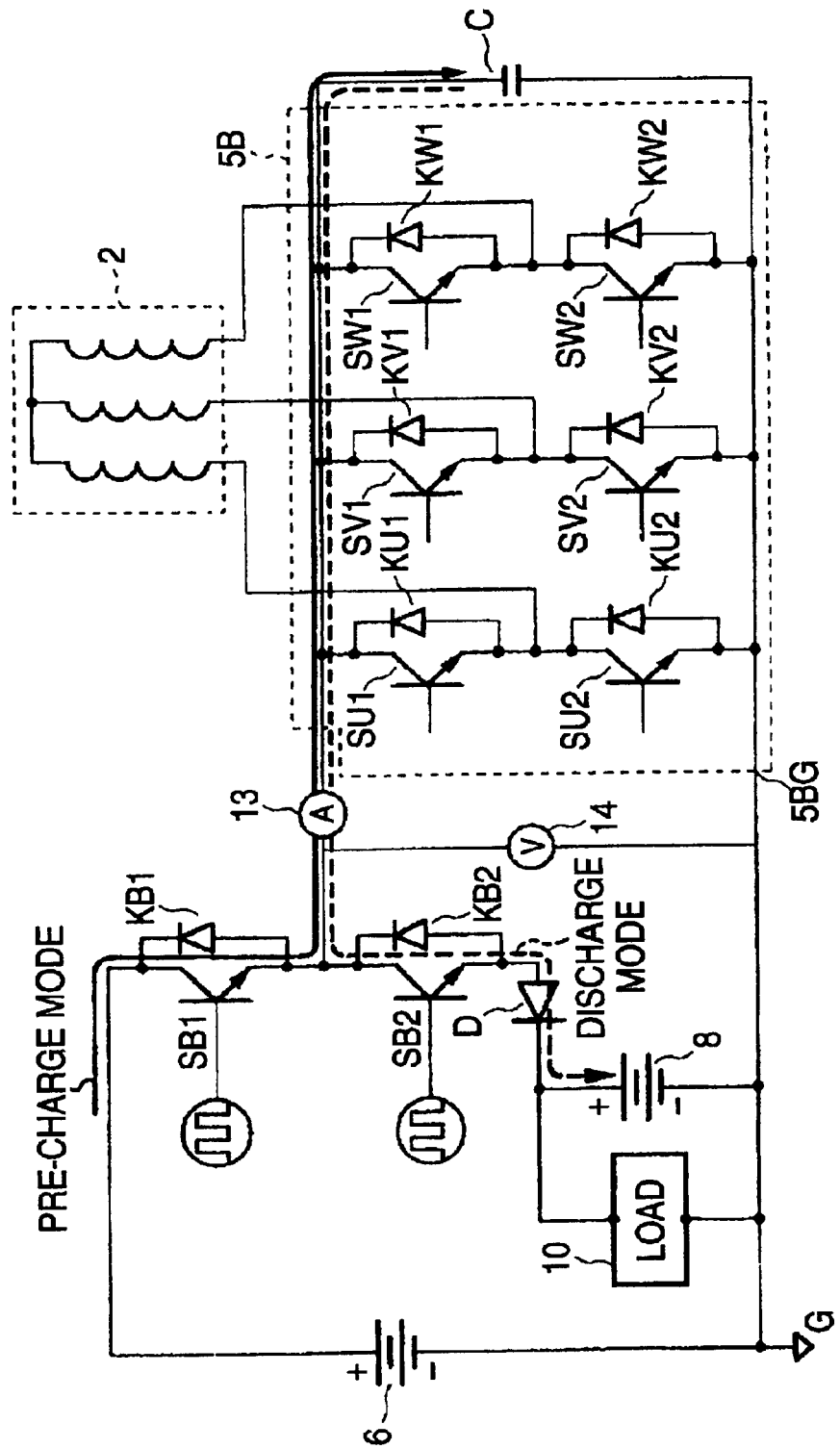
FIG. 6 is an explanatory view of the flow of currents in a pre-charge mode and in a discharge mode.

Now, FIG. 6 is an explanatory view of the flow of currents in a pre-charge mode and a discharge mode. The pre-charge mode is a mode for pre-charging the smoothing condenser C of the inverter 5 using the 42V battery 6, whereas the discharge mode is a mode for discharging the smoothing condenser C of the inverter 5 to thereby lower the voltage across the smoothing condenser C. The discharge of the smoothing condenser C is carried out for securing safety in maintenance and inspection.

In the pre-charge mode, the transistor SB1 is PWM controlled in a given duty and thus it is turned on and off repeatedly. Due to this, the smoothing condenser C is charged with a given current.

In the discharge mode, the transistor SB2 is PWM controlled in a given duty and thus it is turned on and off repeatedly. Due to this, the smoothing condenser C is discharged with a given current.

In these modes, between the transistors SB1, SB2 and bridge circuit 5B, there may be interposed a current detect unit 13: that is, a charge current or a discharge current is detected by the current detect unit 13 and, in accordance with the detect results, the smoothing condenser C can be charged and discharged with a given current. Also, between the grounding terminal 5BG and a point where the emitter of the transistor SB1 is connected to the collector of the transistor SB2, there may be interposed a voltage detect unit 14: that is, while detecting the voltage across the smoothing condenser C using the voltage detect unit 14, the smoothing condenser C can be charged and discharged in such a manner that it provides a desired voltage.

Figure 7:
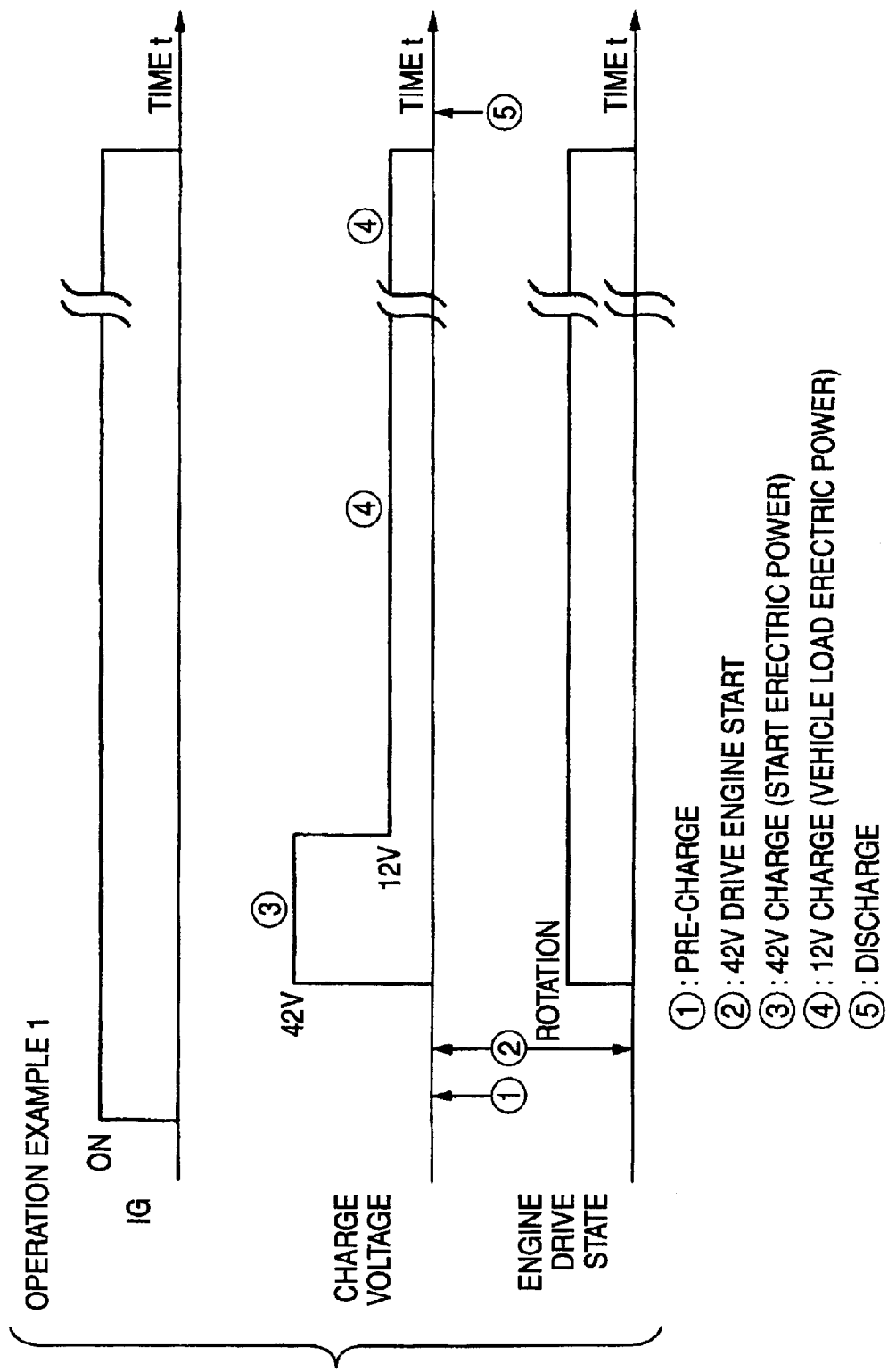
FIG. 7 is a timing chart of a first example of an operation (operation example 1) to be executed for the time from the start of the engine 1 to the stop thereof.

Now, FIG. 7 is a timing chart of an example of the operation (operation example 1) from the start of the engine 1 to the stop thereof. In the operation example 1, there is assumed charge control which is used only in the following case: that is, in a vehicle idling stop operation in which the idling of the engine is stopped while the vehicle is stopping temporarily, the engine is started again from the idling stop condition by the 42V battery. Specifically, in case where an ignition switch (IG) is turned on, firstly, the pre-charge of the smoothing condenser C is executed (1̂), next, the motor generator 2 is driven by the 42V battery 6, the motor generator 2 rotates the engine 1 and, at that time, a plug ignition operation is started, thereby starting the engine 1 (2̂).

Next, in the 42V charge mode, the 42V battery 6 is charged (3̂). In detail, the started engine 1 rotates the motor generator 2 and thus the motor generator 2 operates as a generator; and, due to the electric power generated by the motor generator 2, the 42V battery 6 is charged. The charging amount at that time corresponds to the start electric power that is necessary for the next starting of the engine 1, that is, the 42V battery 6 is replenished with the electric power to be consumed in starting the engine 1 next.

In case where the charging of the electric power into the 42V battery 6 is completed, next, the mode is switched over to the 12V charge mode, in which the 12V battery 8 is charged (4̂). In the 12V charge mode, not only the 12V battery 8 is charged but also the electric power to be consumed by the load 10 connected to the 12V battery 8 is supplied from the motor generator 2 through the inverter 5. That is, after the 42V battery 6 is charged with the electric power necessary for the next engine start, the 12V charge mode is carried out successively.

In case where the ignition switch is turned off, the mode is switched over to the discharge mode, in which the smoothing condenser C is discharged, and thus the voltage across the smoothing condenser C is lowered down to 12V, to thereby secure safety in the maintenance and the inspection.

Figure 8:
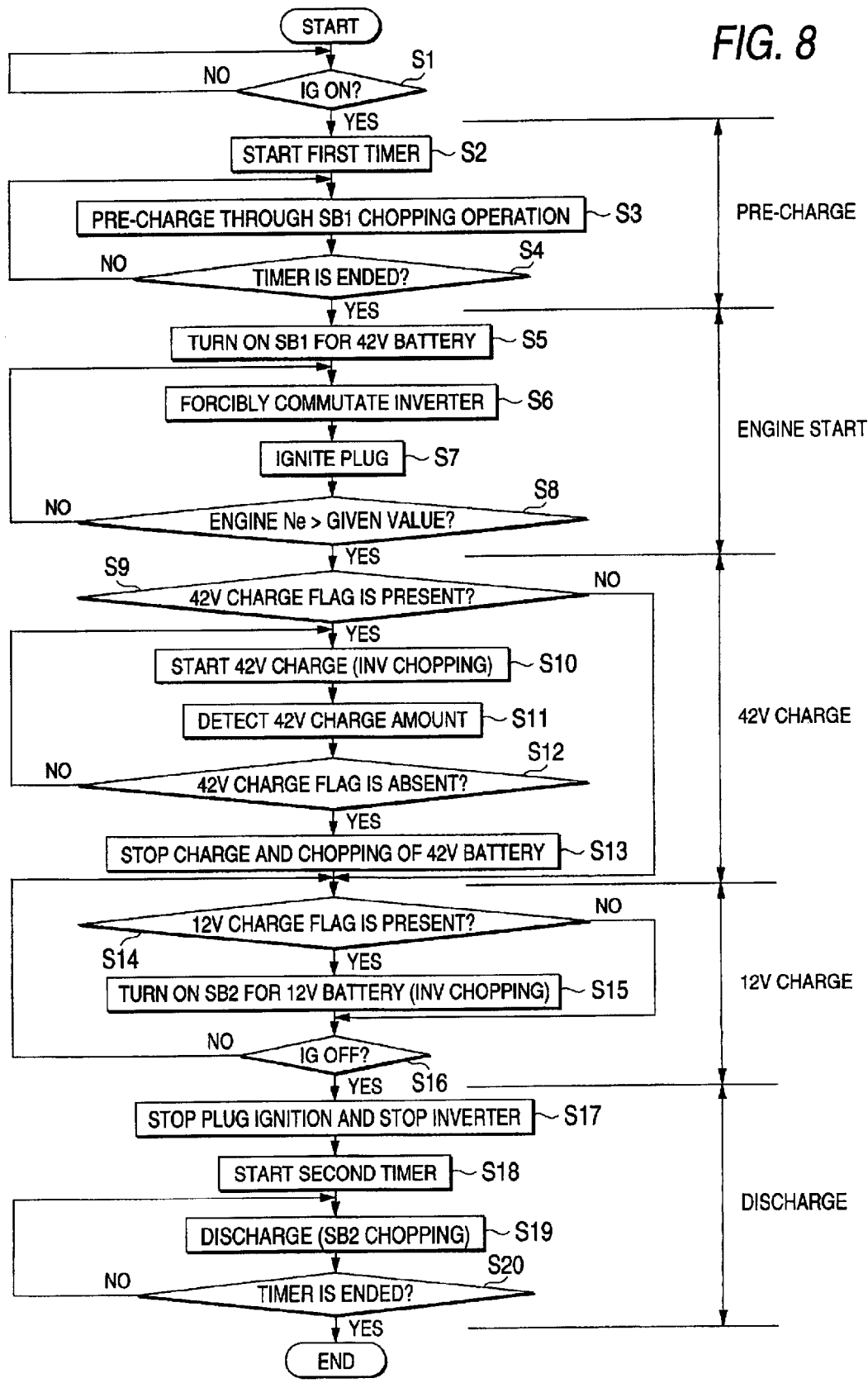
FIG. 8 is a timing chart of the details of the operation of the operation example 1.

Now, FIG. 8 is a flow chart of the details of the operation of the above-mentioned operation example 1. By the way, reference characters such as S1 used in the following description designate steps to be executed in the flow chart. Firstly, it is checked whether the ignition switch is turned on or not (S1). If the ignition switch is turned on, a first timer is started (S2). The first timer is a timer which is incorporated in the ECU 11 and is used to measure the pre-charge time of the smoothing condenser C. Then, the transistor SB1 is PWM controlled for chopping operation to thereby execute the pre-charge operation of the smoothing condenser C (S3), and the first timer is ended (S4), thereby completing the pre-charge operation. In this manner, the pre-charge operation of the smoothing condenser C is executed by a given time.

Next, the transistor SB1 is turned on (S5) and a direct current is supplied from the 42V battery 6 to the bridge circuit 5B of the inverter 5. The bridge circuit 5B of the inverter 5 executes the forced commutation of the direct current supplied thereto (S6), so that the direct current is converted into an alternating current and this alternating current is supplied to the motor generator 2. In response to this, the motor generator 2 operates as a motor and thus the motor generator 2 as a motor rotates the engine 1. And, if the plug is ignited (S7), then the engine 1 is started. The ECU 11 confirms from the output of the rotation angle sensor 2a that the engine rotation number Ne is larger than a given value (S8). That is, the ECU 11 confirms that the engine 11 starts and then idles.

Next, the ECU 11 confirms whether a 42V charge flag to be output when the storage amount of the 42V battery is less than a given value is present or absent (S9); and, if the 42V charge flag is present, then the charging of the 42V battery 6 is started (S10). That is, if the 42V charge flag is present, then the PWM control of the bridge circuit 5B is started to thereby begin the charge of the 42V battery 6. And, the first voltage detect unit 7 detects the voltage across the 42V battery 6 (S11) and sends the detect result to the ECU 11. The ECU 11 checks whether the detected voltage value is a given value or more or not, thereby judging the charged amount of the 42V battery 6; and, if the charged amount is sufficient, then the 42V charge flag is extinguished. The ECU 22 confirms that the 42V charge flag is extinguished (S12) and, after then, the ECU 22 stops the supply of pulses to the bridge circuit 5B (S13) to thereby stop the charge of the 42V battery 6.

On completion of the charge of the 42V battery 6, the ECU 11 confirms the presence or absence of a 12V charge flag (S14) which is output when the storage amount of the 12V battery 8 is less than a given value; and, if the 12V charge flag is present, then the charge of the 12V battery 8 is executed. That is, if the 12V charge flag is present, then the transistor SB2 is turned on and, after then, the PWM control of the bridge circuit 5B is carried out (S15).

If the ignition switch is turned off (S16), then the ignition of the plug is stopped and thus the PWM control of the bridge circuit 5B is also stopped (S17). And, a second timer ( which is also incorporated in the ECU 11) for measuring the discharge time of the smoothing condenser C is started (S18). And, the ECU 11 performs PWM control of the transistor SB2 to thereby execute the discharge of the smoothing condenser C (S19) If the second timer is ended, the discharge of the smoothing condenser C is terminated.

Figure 9:
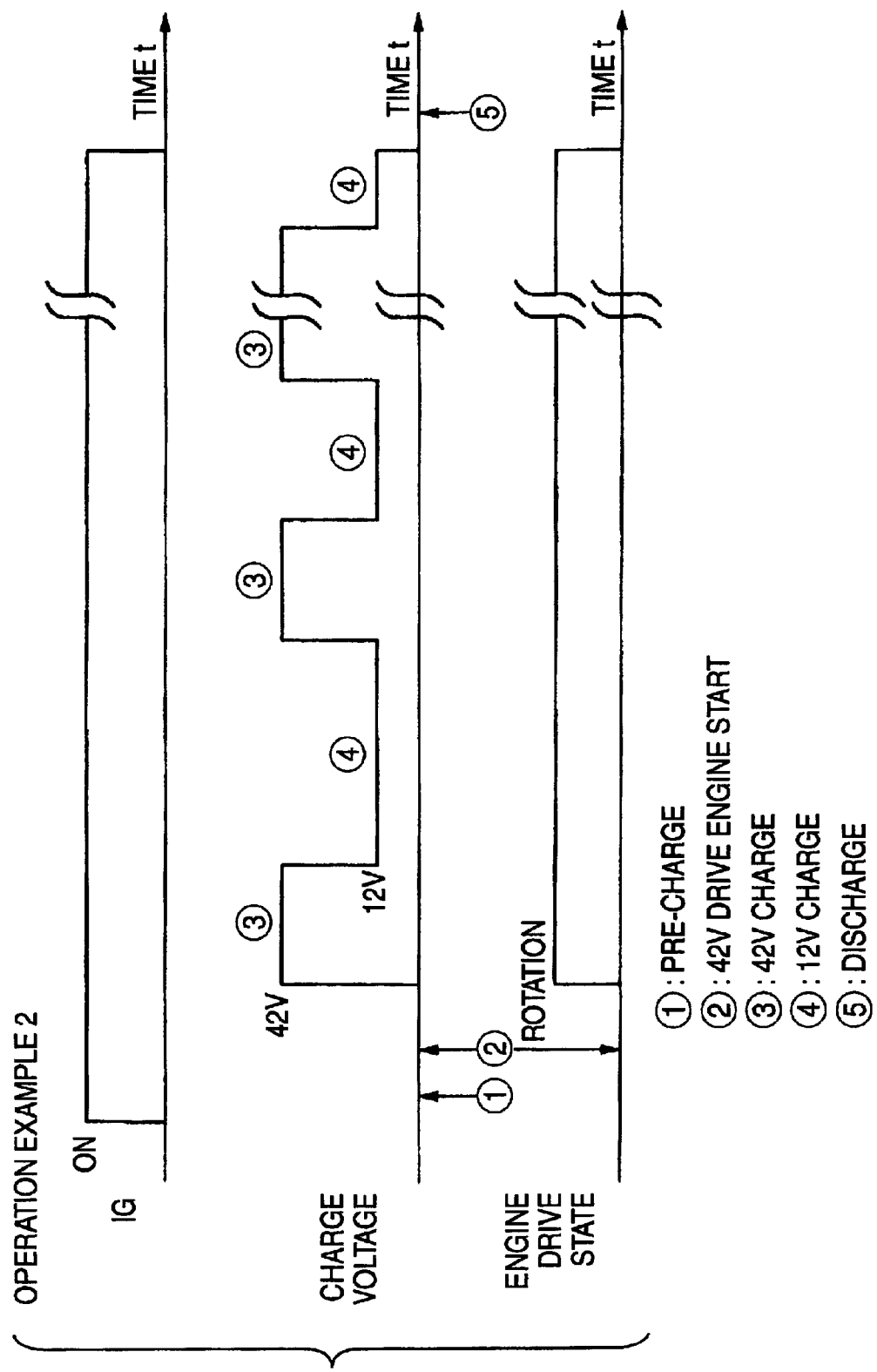
FIG. 9 is a timing chart of a second example of an operation (operation example 2) to be executed for the time from the start of the engine 1 to the stop thereof.

Now, FIG. 9 is a timing chart of a second example (operation example 2) of the operation to be executed for the time from the start of the engine 1 to the stop thereof. In this operation example 2, the charged electric power of the 42V battery 6 is used not only to start the engine by the motor generator 2 but also to execute an assisting operation in which an auxiliary drive operation is carried out by the motor generator 2 while the vehicle is running. If the ignition switch (IG) is turned on, firstly, the pre-charge of the smoothing condenser C is executed (1̂) and, next, the motor generator 2 is driven by the 42V battery 6 and thus the motor generator 2 is allowed to rotate the engine 1 to thereby start the engine 1 (2̂).

Next, the charge of the 42V battery 6 and the charge of the 12V battery 8 are executed alternately (3̂,4̂). Switching of the batteries to be charged is executed in accordance with the accumulated power amounts of the 42V battery 6 and 12V battery 8, or in accordance with the charge flags which are output according to previously set charging timings. If the ignition switch is turned off and the engine 1 is thereby stopped, then the discharge of the smoothing condenser C is executed (5̂).

Figure 10:
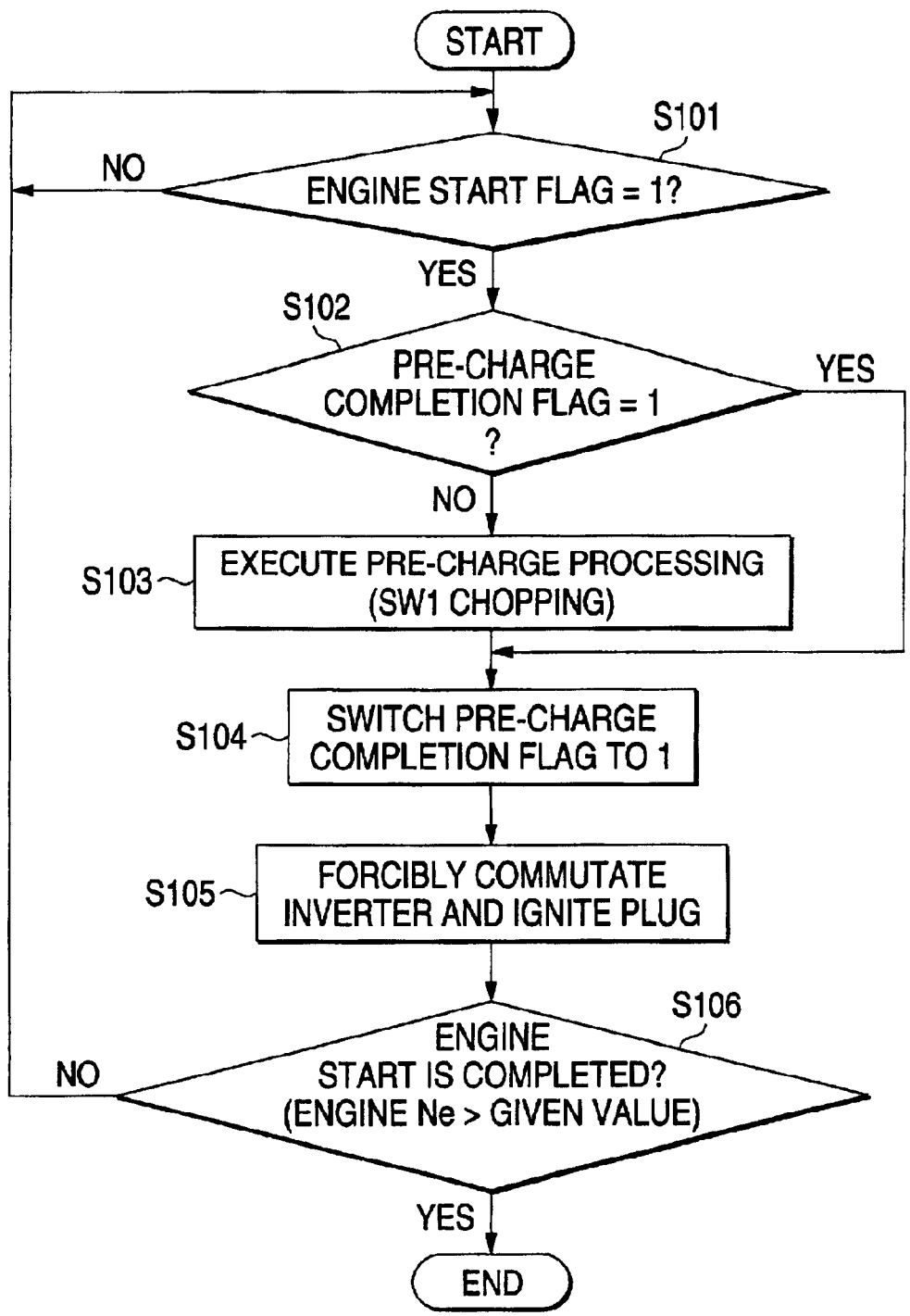
FIG. 10 is a flow chart of the pre-charge operation of a smoothing condenser C and the start operation of an engine in the operation example 2.
Figure 11:
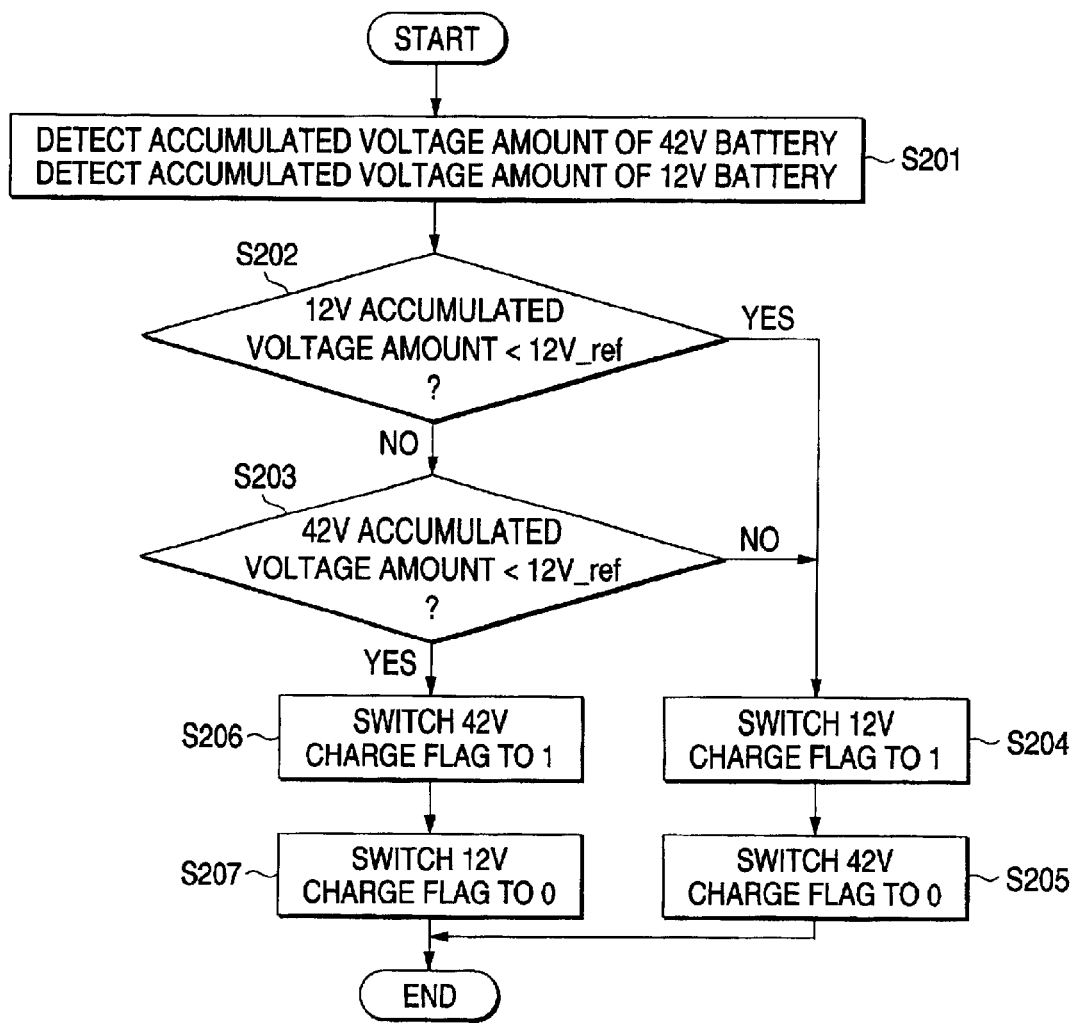
FIG. 11 is a flow chart of an operation to be executed for charging a 42V battery 6 and a 12V battery 8 alternately in the operation example 2.
Figure 12:
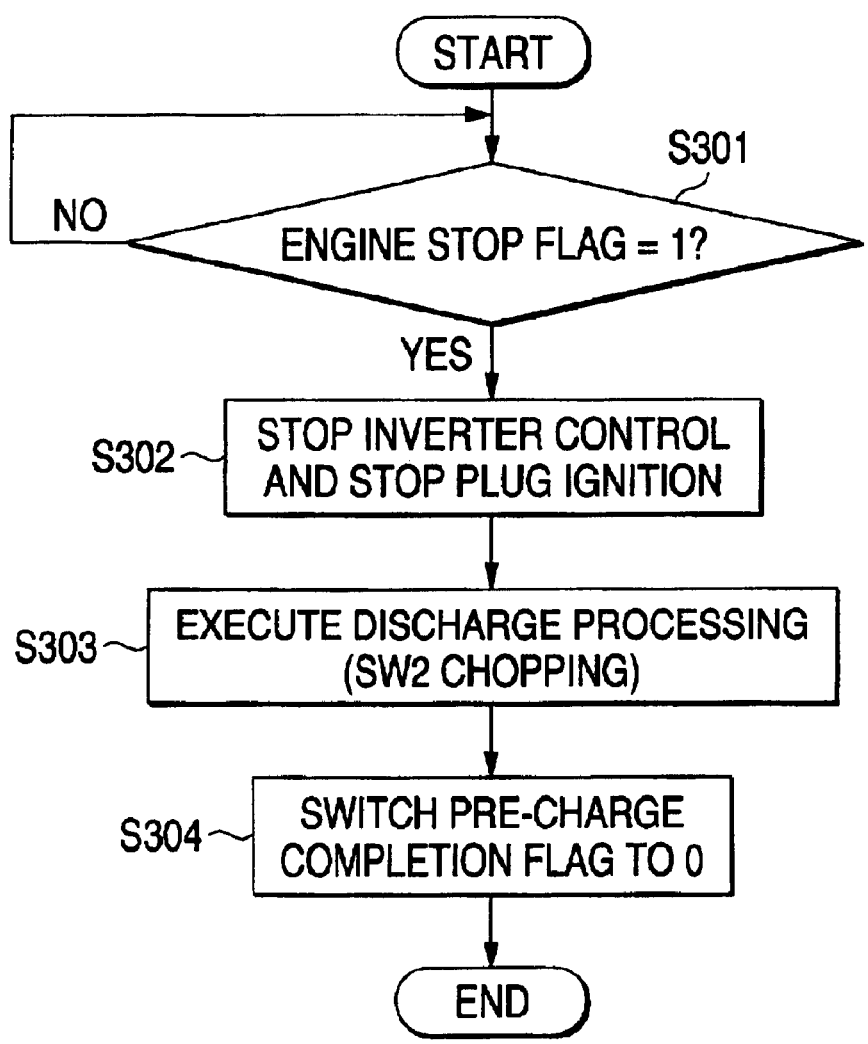
FIG. 12 is a flow chart of the engine stop operation and the discharge operation of the smoothing condenser C in the operation example 2.
Figure 13:
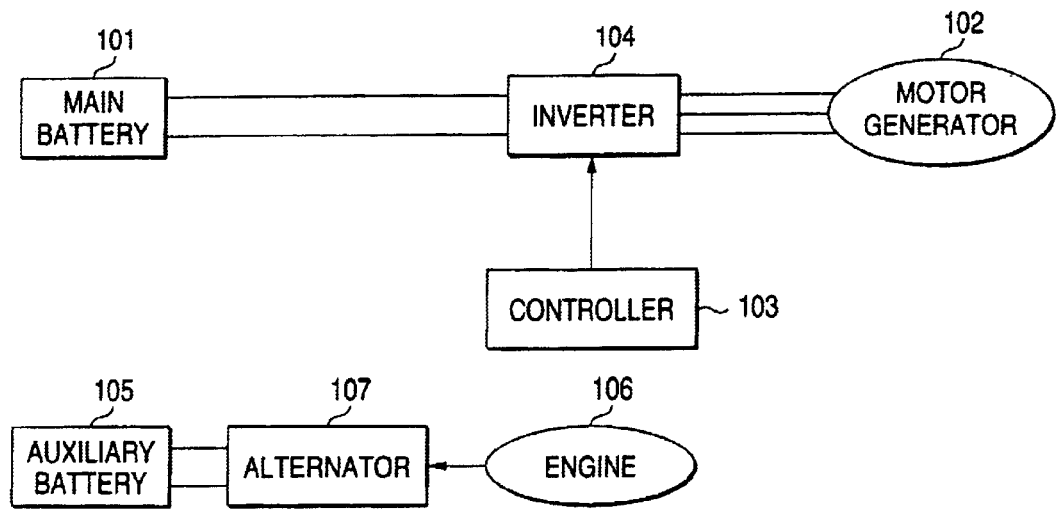
FIG. 13 is a block diagram of a first example of a conventional charging system for charging the batteries of a vehicle making proper use of two kinds of batteries with different voltages; and, FIG. 14 is a block diagram of a second example of a conventional charging system for charging the batteries of a vehicle making proper use of two kinds of batteries with different voltages.
Figure 14:
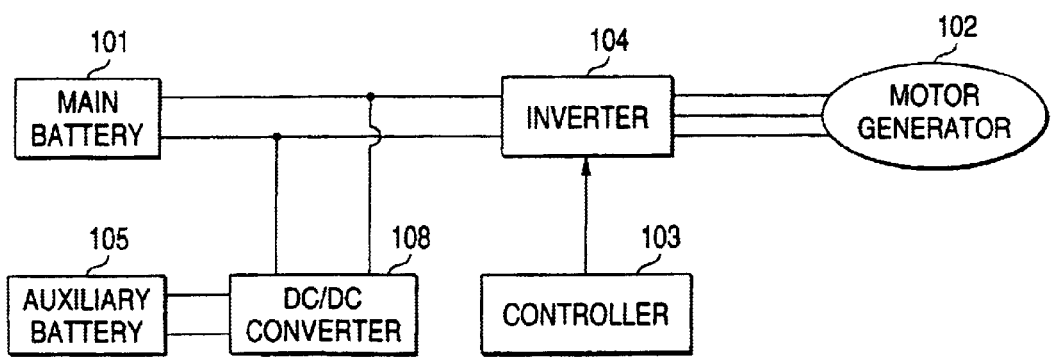

Now, FIGS. 10 to 12 are flow charts of the details of the above-mentioned operation examples 2. That is, FIG. 10 is a flow chart of the pre-charge operation of the smoothing condenser C and the start operation of the engine. And, FIG. 11 is a flow chart of the operation to charge the 42V battery 6 and 12V battery 8 alternately. Also, FIG. 12 is a flow chart of the stop operation of the engine and the discharge operation of the smoothing condenser C. By the way, reference characters such as S101, S201, S301 in the following description designate steps to be executed in the respective flow charts.

Firstly, description will be given below of the flow of the pre-charge operation and engine start operation with reference to FIG. 10. The ECU 11 confirms that an engine start flag, which is output when the ignition switch is turned on, is 1 (S101) and, after then, checks whether a pre-charge completion flag, which is output when the pre-charge operation to pre-charge the smoothing condenser C is completed, is 1 or not (S102). If the pre-charge completion flag is not 1, then the transistor SB1 is PWM controlled to thereby execute the pre-charge operation of the smoothing condenser C (S103); and, if the pre-charge completion flag is 1, then the pre-charge operation of the smoothing condenser C is not executed.

Next, the pre-charge completion flag is set for 1 (S104) And, the transistor SB1 is turned on and a direct current is supplied from the 42V battery 6 to the bridge circuit 5B. Then, the bridge circuit 5B forcibly commutates the direct current supplied thereto, thereby converting it into an alternating current. This alternating current is supplied to the motor generator 2 and thus the motor generator 2 rotates the engine 1. At the same time, the plug is ignited (S105), thereby starting the engine 1. The ECU 11, in accordance with the output of the rotation angle sensor 2a, detects the rotation number Ne of the engine 1 and checks whether the rotation number Ne of the engine 1 is larger than a given value or not, thereby judging whether the start of the engine 1 is completed or not (S106).

Next, description will be given below of the flow of a charge operation to charge the 42V battery 6 and 12V battery 8 alternately according to their respective accumulated voltage amounts with reference to FIG. 11. Firstly, the accumulated voltage amount of the 42V battery 6 and the accumulated voltage amount of 12V battery 8 are detected respectively (S201). Specifically, the first voltage detect unit 7 and second voltage detect unit 9 detect the voltages across the respective batteries and, in accordance with the detect results, the ECU 11 calculates the accumulated voltage amounts of the respective batteries.

Next, the accumulated voltage amount of 12V battery 8 is compared with its reference value (S202); and, if it is found smaller than the reference value, then the 12V charge flag is set for 1 (S204) and the 42V charge flag is set for 0 (S205). This executes the charge operation of the 12V battery 8.

If the accumulated voltage amount of 12V battery 8 is found equal to or larger than the reference value, then the accumulated voltage amount of 42V battery 6 is compared with its reference value (S203); and, if it is found smaller than the reference value, then the 42V charge flag is set for 1 (S206) and the 12V charge flag is set for 0 (S207). This executes the charge of the 42V battery 6.

By the way, the switching of the charge operation of the 42V battery 6 and the charge operation of the 12V battery 8 over to each other may also be executed in accordance not with their accumulated voltage amounts but with a previously set switching time.

Next, description will be given below of the flow of the engine stop operation and the discharge operation of the smoothing condenser C with reference to FIG. 12. If the ECU 11 confirms that the engine stop flag is 1 (S301), then the ECU 11 stops the PWM control of the bridge circuit 5B of the inverter 5 and also stops the ignition of the plug (S302), thereby causing the engine 1 to stop. And, the transistor SB2 is PWM controlled to thereby execute the discharge operation of the smoothing condenser C (S303). If the discharge operation is completed, then a pre-charge completion flag is set for 0 (S304).

While only certain embodiments of the invention have been specifically described herein, it will apparent that numerous modifications may be made thereto without departing from the spirit and scope of the invention.

As described in the above, according to a first aspect of the invention, there is provided a charging system for a vehicle, including: a motor generator (in the embodiment, a motor generator 2) which operates as a generator to generate an alternating current when the motor generator is driven by an internal combustion engine (in the embodiment, an engine 1), and operates as a motor when an alternating current is supplied thereto; a switching circuit (in the embodiment, a bridge circuit 5B) for converting an alternating current generated by the motor generator into a direct current; a first accumulator (in the embodiment, a 42V battery 6) for accumulating therein the direct current converted by the switching circuit; a second accumulator (in the embodiment, a 12V battery 8) for accumulating therein the direct current converted by the switching circuit and having an accumulation voltage smaller than that of the first accumulator; a first opening/closing unit (in the embodiment, a transistor SB1 and parasitic diode KB1) interposed between the first accumulator and switching circuit; a second opening/closing unit (in the embodiment, a transistor SB2 and a reverse current preventive diode D) interposed between the second accumulator and switching circuit; and, a control unit (in the embodiment, an ECU 11) for controlling the opening and closing of the first and second opening/closing units.

According to the above structure, when the motor generator operates as a generator, an alternating current generated by the motor generator is converted to a direct current. The control unit controls the opening and closing of the first and second opening/closing units, and supplies the thus-converted direct current to the first or second accumulator to thereby charge the first or second accumulator.

Therefore, there is eliminated the need for provision of an alternator and a DC/DC converter that have been necessary in the conventional charging systems, which not only can simplify the structure of the charging system but also can reduce the manufacturing cost thereof.

According to a second aspect of the invention, in a charging system for a vehicle as set forth in the first aspect of the invention, the first opening/closing unit includes a first transistor (in the embodiment, a transistor SB1) with its collector connected to a positive terminal of the first accumulator and its emitter connected to a positive-side input/output terminal of the switching circuit, and a diode (in the embodiment, a parasitic diode KB1) disposed in parallel to the first transistor for allowing a current to flow therethrough in a direction from the positive-side input/output terminal of the switching circuit toward the positive terminal of the first accumulator; and, the second opening/closing unit includes a second transistor (in the embodiment, a transistor SB2) with its collector connected to the positive-side input/output terminal of the switching circuit, and a reverse current preventive diode (in the embodiment, a reverse current preventive diode D) connected between the emitter of the second transistor and the positive terminal of the second accumulator for preventing a current from flowing in a direction from the positive terminal of the second accumulator toward the emitter of the second transistor.

According to a third aspect of the invention, in a charging system for a vehicle as set forth in the first aspect of the invention, the control unit includes a drive mode (in the embodiment, a 42V drive mode) for driving said motor generator using the first accumulator, a first accumulating mode (in the embodiment, a 42V charge mode) for accumulating electric power generated by the motor generator in the first accumulator, and a second accumulating mode (in the embodiment, a 12V charge mode) for accumulating electric power generated by the motor generator in the second accumulator; and, in the drive mode, the first opening/closing unit is held in a closed state and the second opening/closing unit is held in an opened state, in the first accumulating mode, the first and second opening/closing units are both held in an opened state, and, in the second accumulating mode, the first opening/closing unit is held in an opened state and the second opening/closing unit is held in a closed state.

According to a fourth aspect of the invention, in a charging system for a vehicle as set forth in the first aspect of the invention, there is further included a voltage detect unit (in the embodiment, a first voltage detect unit 7 and a second voltage detect unit 9) for detecting the accumulated voltages of the first and second accumulators, wherein the control unit controls the electric energization rate of the switching circuit according to the deviation of the detected voltage detected by the voltage detect unit from a previously set reference voltage.

According to the above structure, since the electric energization rate of the switching circuit is controlled according to the deviation of the detected voltage detected by the voltage detect unit from the previously set reference voltage, electric power can be accumulated in the first and second accumulators while applying a desired voltage thereto.

According to a fifth aspect of the invention, in a charging system for a vehicle as set forth in the first aspect of the invention, there is further included a smoothing condenser (in the embodiment, a smoothing condenser C) connected between the positive-side input/output terminal of the switching circuit and a grounding terminal, wherein the control unit includes a pre-charge mode (in the embodiment, a pre-charge mode) for opening and closing the first opening/closing unit with a previously set electric energization rate to thereby charge the smoothing condenser.

According to the above structure, it is possible to execute a pre-charge operation to previously charge the smoothing condenser with a desired current.

According to a sixth aspect of the invention, in a charging system for a vehicle as set forth in the first aspect of the invention, there is further included a smoothing condenser connected between the positive-side input/output terminal of the switching circuit and a grounding terminal, wherein the control unit includes a discharge mode (in the embodiment, a discharge mode) for opening and closing the second opening/closing unit with a previously set electric energization rate to thereby discharge the smoothing condenser.

According to the above structure, it is possible to execute a discharge operation to discharge the smoothing condenser with a desired current.

According to a seventh aspect of the invention, in a charging system for a vehicle as set forth in the fifth aspect of the invention, there is further included a current detect unit (in the embodiment, a current detect unit 13) for detecting an input current to the switching circuit, wherein the control unit controls the electric energization rate of the first opening/closing unit according to the deviation of a detected current value detected by the current detect unit from a previously set reference current value.

According to the above structure, since the control unit controls the electric energization rate of the first opening/closing unit according to the deviation of a detected current value detected by the current detect unit from a previously set reference current value, a pre-charge operation can be executed with a constant current.

According to an eighth aspect of the invention, in a charging system for a vehicle as set forth in the sixth aspect of the invention, there is further included current detect unit for detecting an input current to the switching circuit, wherein the control unit controls the electric energization rate of the second opening/closing unit according to the deviation of a detected current value detected by the current detect unit from a previously set reference current value.

According to the above structure, since the control unit controls the electric energization rate of the second opening/closing unit according to the deviation of a detected current value detected by the current detect unit from a previously set reference current value, a discharge operation can be executed with a constant current.

What is claimed is:

1. A charging system for a vehicle, comprising:

a motor generator which operates as a generator to generate an alternating current when said motor generator is driven by an internal combustion engine, and operates as a motor when the alternating current is supplied thereto;

a switching circuit for converting the alternating current generated by said motor generator into a direct current;

a first accumulator accumulating therein the direct current converted by said switching circuit;

a second accumulator accumulating therein the direct current converted by said switching circuit and having a smaller accumulation voltage than that of said first accumulator;

a first opening/closing unit interposed between said first accumulator and said switching circuit;

a second opening/closing unit interposed between said second accumulator and said switching circuit; and, a control unit for controlling the opening and closing of said first and second opening/closing units.

2. A charging system for a vehicle as set forth in claim 1, wherein said first opening/closing unit comprises:

a first transistor having a collector connected to a positive terminal of said first accumulator and an emitter connected to a positive-side input/output terminal of said switching circuit; and a diode disposed in parallel to said first transistor for allowing a current to flow therethrough in a direction from said positive-side input/output terminal of said switching circuit toward said positive terminal of said first accumulator, and, wherein said second opening/closing unit comprises:

a second transistor having a collector connected to said positive-side input/output terminal of said switching circuit; and a reverse current preventive diode connected between the emitter of said second transistor and said positive terminal of said second accumulator for preventing a current from flowing in a direction from the positive terminal of said second accumulator toward said emitter of said second transistor.

3. A charging system for a vehicle as set forth in claim 1, wherein said control unit comprises:

a drive mode for driving said motor generator using said first accumulator;

a first accumulating mode for accumulating electric power generated by said motor generator in said first accumulator; and a second accumulating mode for accumulating electric power generated by said motor generator in said second accumulator, and wherein, in said drive mode, said first opening/closing unit is held in a closed state and said second opening/closing unit is held in an opened state, further wherein, in said first accumulating mode, said first and second opening/closing units are both held in an opened state, and, further wherein, in said second accumulating mode, said first opening/closing unit is held in an opened state and said second opening/closing unit is held in a closed state.

4. A charging system for a vehicle as set forth in claim 1, further comprising:

a voltage detect unit for detecting the accumulated voltages of said first and second accumulators, wherein said control unit controls the electric energization rate of said switching circuit according to the deviation of the detected voltage detected by said voltage detect unit from a previously set reference voltage.

5. A charging system for a vehicle as set forth in claim 1, further comprising:

a smoothing condenser connected between the positive-side input/output terminal of said switching circuit and a grounding terminal, wherein said control unit includes a pre-charge mode for opening and closing said first opening/closing unit with a previously set electric energization rate so as to charge said smoothing condenser.

6. A charging system for a vehicle as set forth in claim 1, further comprising:

a smoothing condenser connected between the positive-side input/output terminal of said switching circuit and a grounding terminal, wherein said control unit includes a discharge mode for opening and closing said second opening/closing unit with a previously set electric energization rate so as to discharge said smoothing condenser.

7. A charging system for a vehicle as set forth in claim 5, further comprising:

a current detect unit for detecting an input current to said switching circuit, wherein said control unit controls the electric energization rate of said first opening/closing unit according to the deviation of a detected current value detected by said current detect unit from a previously set reference current value.

8. A charging system for a vehicle as set forth in claim 6, further comprising:

a current detect unit for detecting an input current to said switching circuit, wherein said control unit controls the electric energization rate of said second opening/closing unit according to the deviation of a detected current value detected by said current detect unit from a previously set reference current value.

* * * * *